June 9, 1925. 1,541,273
H. C. NUGENT
FLUID BRAKE
Filed Sept. 7, 1923 2 Sheets-Sheet 2
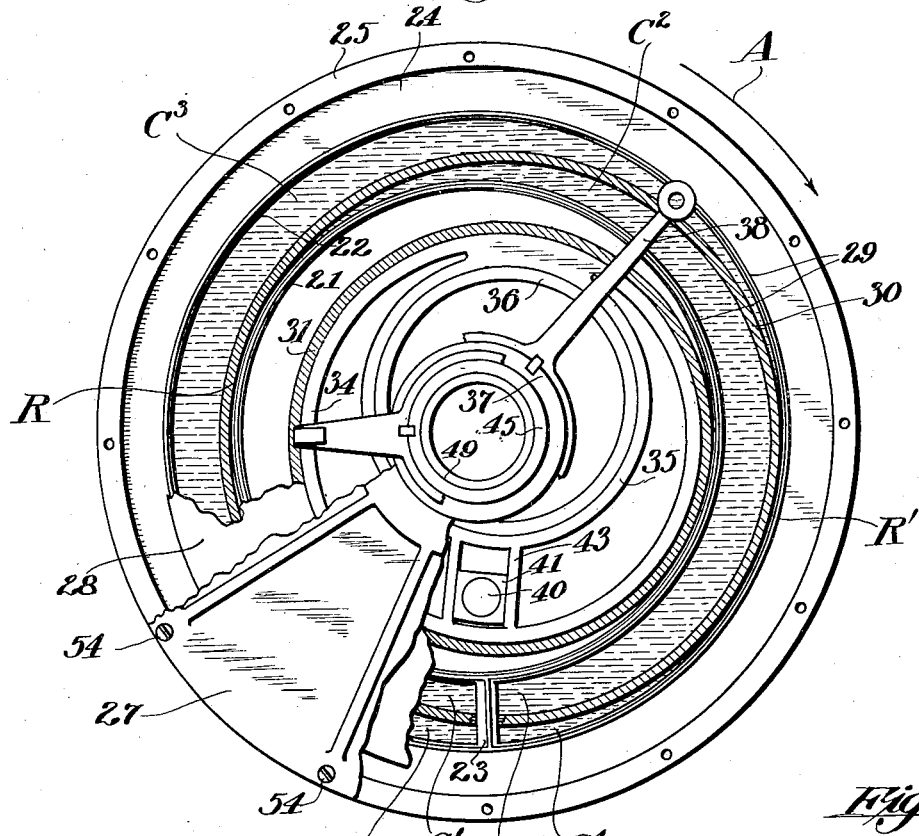
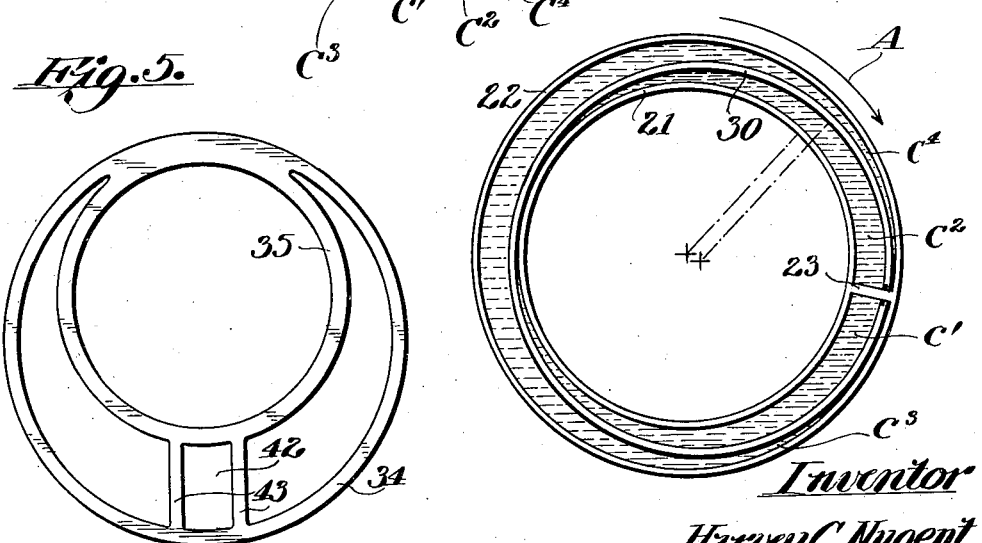
Inventor
Harvey C. Nugent
by Hazard and Miller
Att'ys Patented June 9, 1925.

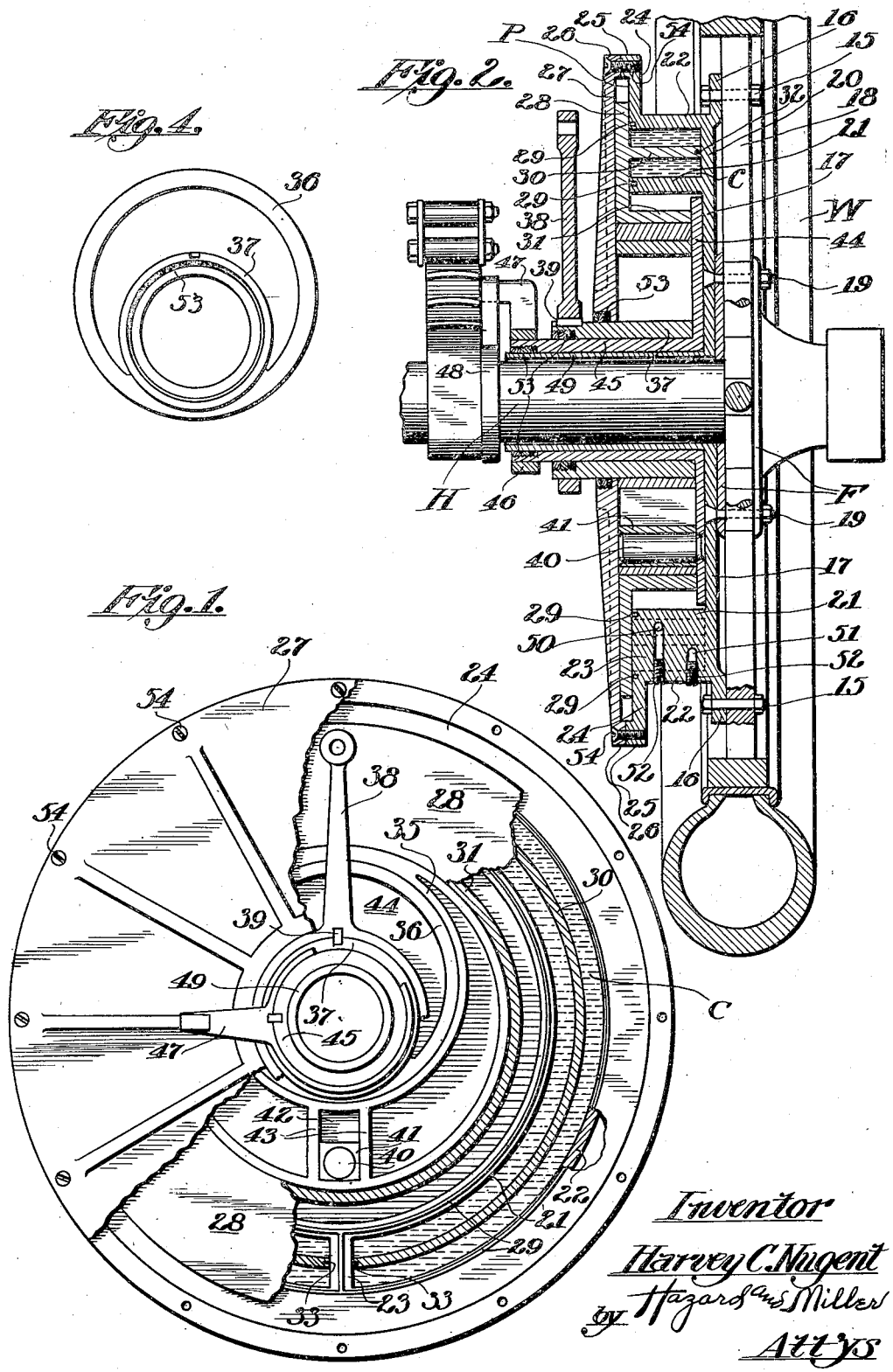

1,541,273

UNITED STATES PATENT OFFICE.

HARVEY C. NUGENT, OF LONG BEACH, CALIFORNIA.

FLUID BRAKE.

Application filed September 7, 1923. Serial No. 661,443.

*To all whom it may concern:*

Be it known that I, HARVEY C. NUGENT, a citizen of the United States, residing at Long Beach, in the county of Los Angeles and State of California, have invented new and useful Improvements in Fluid Brakes, of which the following is a specification.

My invention relates to machine brakes and more particularly to brakes in which a fluid is utilized to absorb the energy of retardation.

One object of my invention is the provision of means to secure braking action by forcing a relatively non-compressible fluid through one or more restricted apertures the size of which may be regulated according to the amount of braking action desired.

Another object is to provide a brake which is free from the noise of drum and band brakes such as are in common use at present.

A further object is to be found in the great durability of my brake, this being due to the perfect lubrication of parts by the operating fluid, which preferably is oil.

A still further advantage of my brake may be seen in its ease of operation, this permitting it to be set for maximum braking action with but a slight expenditure of energy by the operator.

These and further objects and advantages will be made manifest in the following specification of one embodiment of my invention, illustrated in the accompanying drawings, in which:

Fig. 1 is a view in elevation of the brake comprising my invention in non-braking position, and with the cover and other parts broken away to reveal the construction of the brake.

Fig. 2 is a vertical sectional view of the brake as shown in Fig. 1.

Fig. 3 is a view similar to Fig. 1 except that the brake is shown in one extreme braking position.

Fig. 4 is a view in elevation of the operating eccentric of the brake.

Fig. 5 is a view in elevation of the operated eccentric of the brake.

Fig. 6 is a diagrammatic view of the brake turned so the transverse wall is at a point of maximum resistance.

The brake comprising the present embodiment of my invention, is mounted, for use on a vehicle, upon the inner side of a wheel W, co-axially with the axle thereof and its housing H. This is effected by bolts 15 securing lugs 16 of the brake casing 17 to the spokes 18 of wheel W. In addition to this, other bolts 19, may extend through and secure together the casing 17, the spokes 18, and the flanges F of the wheel W.

The casing 17 is drum shaped, the circular head 20 of which carries spaced concentric bands 21 and 22 formed integral with the head and a connecting wall 23, thus bounding an annular channel C interrupted by the wall and open on the opposite side of the drum from its head, this opening being in a plane P parallel to the head.

Forming an extension in the plane P from the periphery of the band 22, is the marginal flange 24, the outer edge of which is provided with a bead 25 to co-operate with a bead 26 on the casing cover 27 in spacing the cover from the flange so as to accommodate between them a flat ring 28 for a limited eccentric movement. It is this eccentric movement of ring 28 which effects the braking action as will be made clear further on.

The open face of channel C is at all times tightly covered by the flat ring 28 being pressed by the cover 27 against gaskets 29 provided in edges of bands 21 and 22 contiguous thereto. Integral and concentric with ring 28 and projecting therefrom toward drum head 20 are two bands 30 and 31. The band 30, provided with an opening fitting wall 23, projects into channel C normally equidistant from bands 21 and 22 and is of such width that gasket 32, provided in its edge, contacts and makes a sliding fluid-tight joint with drum head 20. The faces of the opening in band 30 which contact with wall 23, are provided with gaskets 33 which form a sliding fluid-tight joint therewith. The band 31 joins the flat ring 28 at its inner edge and is of such radius as to be at all times at an equal or greater distance from the band 21 than band 30 is from band 21.

This inner band 31 forms a hub for the ring 28 which bears upon a bearing shell 34. When the brake is in non-braking position as shown in Fig. 1, the bearing shell 34 is concentric with the axle housing H. Means for moving bearing shell 34 off center are provided, as an eccentric hub 35 within bearing shell 34, and an eccentric 36 formed upon a hollow shaft 37 which extends through and fits closely a central opening in the brake casing cover 27. The hollow shaft 37 is provided with an operating arm 38, keyed to the shaft at 39, and positively linked to manual control means (not shown) which permits rotation by the operator of hollow shaft 37, sufficiently to effect any degree of braking action desired.

Means for holding bearing shell 34 against rotation is provided in a pin 40 upon which is rotatably mounted a slide 41 which is fitted slidably in slot 42 formed by webs 43 joining bearing shell 34 and a eccentric hub 35. Pin 40 is fixedly mounted upon a disc 44 which lies against casing head 20 and is integral at a central opening with a hollow shaft 45. Shaft 45 fits interiorly hollow shaft 37 and extends beyond it to receive a collar 46 keyed thereto and provided with an arm 47 which is held against rotation by a bracket 48 secured to axle housing H.

Fitting within shaft 45 and spaced concentrically from axle housing H is an arbor 49 which is formed integral with drum head 20 at the edge of a central opening therein. This mandrel co-operates with the opening in cover plate 27 to center and support hollow shafts 37 and 45.

Entrance to the inner and outer portions of channel C for filling with oil is obtained through openings 50 and 51, respectively, formed in wall 23 and which are normally closed as by screws 52.

The operation of my brake is as follows:

When no braking action is desired, the arm 38 is maintained in vertical position as shown in Fig. 1 which causes the bearing shell 34 and the ring 28 which rotates upon it to be concentric with the axle housing H and brake casing 17. It will be noted that at this time the band 30, which is in the nature of a rotating piston, is equidistant from and concentric with the walls 21 and 22 of channel C, the space on both sides of band 30 being filled with oil.

Now turning to Fig. 3 which shows the brake in extreme braking position, it is to be noted here that movement of the arm 38 to the right has turned hollow shaft 37 and hence eccentric 36 a corresponding degree in the same direction. The center of bearing shell 34, being determined by its mounting upon the slide 41 and the eccentric 36, is therefore moved off the center of the brake casing 17 which carries channel C. This movement of bearing shell 34 in relation to casing 17 is shared by the flat ring 28 and the concentric bands 30 and 31 integrally formed thereon. Thus as wheel W and the casing 17 turn concentrically in the direction of arrow A, the flat wall 28 urged by engagement of the piston ring 30 with radial wall 23 which forms an abutment, turns in the same direction but on an eccentric center as to the casing center. The effect of this may easily be seen by following the wall 23 (in Fig. 3) from its position as shown to where it will be opposite the point of maximum resistance R between band 30 and inner band 21. In order for the wheel to move this distance the oil occupying the space $C'$ will have to be forced through the restricted space at R under the piston band 20 into the space $C^2$, while a portion of the oil shown as occupying space $C^3$ will have to be forced through the restricted space between band 30 and outer band 22 as at $R'$ and into the space $C^4$. It will be seen that two zones of resistance to flow are obtained. When the abutment wall 23 is at the point of maximum resistance R, it will be seen that space $C'$ and space $C^2$ are temporarily united, but, as abutment wall 23 moves on around, the space $C^2$ begins to increase from practically nothing while $C'$ again decreases in size and must force the oil into space $C^2$. The abutment wall 23 having reached the maximum point of resistance $R'$, spaces $C^3$ and $C^4$ will be seen to have joined, only to have a new space $C^4$ develop, as abutment wall 23 moves on from point $R'$, gradually increasing in size while the new space $C^3$ decreases and forces oil into the new space $C^4$.

The resistance to the rotation of the brake casing 17 which may thus be set up is limited only by the strength of the parts as the restricted spaces R and $R'$ may be practically closed against any passage of oil thus locking the brake against the possibility of being turned. Needless to point out, the operator has free choice of any degree of braking action between this extreme and utter freedom of movement.

In order to prevent leakage of oil from the brake casing 17, packing glands 53 are provided in the center aperture in cover 27 to make a fluid tight joint against shaft 37. Similar packing glands for the same purpose are provided in the ends of shafts 37 and 45.

Screws 54 are provided for securing brake casing cover 27 to the bead 25 of the casing flange 24.

What I claim is:

1. Means for retarding the rotation of an object, comprising a chamber for retaining a fluid and adapted to rotate with the object, means for dividing the space in the chamber so that continued rotation thereof will be resisted by the necessity for the fluid to pass from one part of the chamber into another part through a restricted connecting space.

2. Means for retarding the rotation of an object, comprising a chamber for retaining a fluid and adapted to rotate with the object, means for dividing the space in the chamber so that continued rotation thereof will be resisted by the necessity for the fluid to pass from one part of the chamber into another part through a restricted connecting space, and means for controlling the size of the connecting space.

3. Means for retarding the rotation of an object, comprising a chamber for retaining a fluid and adapted to rotate with the object, means for dividing the space in the chamber so that continued rotation thereof will be resisted by the necessity for the fluid to pass from certain parts of the chamber into other parts through restricted connecting spaces.

4. Means for retarding the rotation of an object, comprising a chamber for retaining a fluid and adapted to rotate with the object, means for dividing the space in the chamber so that continued rotation thereof will be resisted by the necessity for the fluid to pass from certain parts of the chamber into other parts tl rough restricted connecting spaces, and means for controlling the size of the connecting spaces.

5. Braking means, comprising a shell, an annular channel therein, a transverse wall interrupting said channel, a cover retaining a fluid in said channel and adapted to rotate with said shell, a piston band projecting from said cover on opposite sides of said wall so as to divide said channel into a plurality of chambers, and means for moving the center of rotation of the cover and piston band so as to set up currents in the fluid and provide restriction for the same.

6. Braking means, comprising a shell having an enclosed annular channel adapted for rotation about a fixed axis, a wall interrupting the continuity of said channel, a fluid contained in said channel, another wall dividing the channel into compartments and adapted to rotate concurrently with said channel and about a movable axis in such a manner that when said movable axis is eccentric with the fixed axis currents are set up in the fluid during rotation of the channel which resist said rotation.

7. Hydraulic braking means, comprising a shell adapted to be concentrically fixed to a rotatable element, an annular channel concentrically provided therein with an open face, a transverse wall interrupting the continuity of said channel, a cover slidably retained in covering relation with said open face, a fluid retained in said channel, an annular piston band projecting from said cover into said channel slidingly fitting said transverse wall and dividing said channel into a plurality of compartments, means for causing said cover and piston band to rotate concentrically with said channel, control means for moving said means so that said cover and piston band will rotate eccentrically in relation to said channel.

8. In a hydraulic brake, means for setting up a plurality of restricted currents within a confined fluid.

9. In a hydraulic brake, means for setting up a plurality of restricted currents within a confined fluid, and control means for regulating the restriction of said currents.

10. In a hydraulic brake, means for setting up a plurality of restricted currents within a confined fluid in such manner that the retarding action of said restricted currents for a given adjustment operates continuously throughout the rotation of an element provided with said brake.

11. In a hydraulic brake, means for setting up a plurality of restricted currents within a confined fluid in such manner that the retarding action of said restricted currents for a given adjustment operates continuously and relatively uniformly throughout the rotation of an element provided with said brake.

12. Braking means, comprising a shell, having an annular channel, a transverse wall interrupting said channel, a cover retaining a fluid in said channel and adapted to rotate with said shell, a piston band projecting from said cover so as to divide said channel into a plurality of chambers, and means for moving the center of rotation of the cover and piston band so as to set up currents in the fluid and provide restriction for the same, the last mentioned means comprising an eccentrically adjustable bearing upon which said cover rotates.

13. Braking means, comprising a shell, having an annular channel, a transverse wall interrupting said channel, a cover retaining a fluid in said channel and adapted to rotate with said shell, a piston band projecting from said cover so as to divide said channel into a plurality of chambers, and means for moving the center of rotation of the cover and piston band so as to set up currents in the fluid and provide restriction for the same, the last mentioned means comprising an eccentrically adjustable bearing upon which said cover rotates, a fixed trunnion for holding said bearing against rotation, and an operating eccentric for shifting said bearing.

14. Braking means, comprising a shell, having an annular channel, a transverse wall interrupting said channel, a cover retaining a fluid in said channel and adapted to rotate with said shell, a piston band projecting from said cover so as to divide said channel into a plurality of chambers, and means for moving the center of rotation of the cover and piston band so as to set up currents in the fluid and provide restriction for the same, the last mentioned means comprising an eccentrically adjustable bearing upon which said cover rotates, a fixed trunnion for holding said bearing against rotation, and an operating eccentric for shifting said bearing, said eccentric being provided with manually control means.

15. In a hydraulic brake, means for setting up a plurality of restricted currents within a confined fluid in such manner that the retarding action of said restricted currents for a given adjustment which operates continuously and relatively uniformly throughout the continued rotation of an element provided with said brake, and control means for regulating the restriction of said currents.

In testimony whereof I have signed my name to this specification.

HARVEY C. NUGENT.